(No Model.)

W. A. PATERSON.
ROAD CART.

No. 381,415. Patented Apr. 17, 1888.

Attest:
H. S. Sprague.
P. M. Hulbert.

Inventor.
Wm. A. Paterson.
By Thos. S. Sprague & Son
Att'y.

UNITED STATES PATENT OFFICE.

WILLIAM A. PATERSON, OF FLINT, MICHIGAN.

ROAD-CART.

SPECIFICATION forming part of Letters Patent No. 381,415, dated April 17, 1888.

Application filed November 7, 1887. Serial No. 254,509. (No model.)

*To all whom it may concern:*

Be it known that I, WILLIAM A. PATERSON, a citizen of the United States, residing at Flint, in the county of Genesee and State of Michigan, have invented certain new and useful Improvements in Road-Carts, of which the following is a specification, reference being had therein to the accompanying drawings.

This invention relates to new and useful improvements in road-carts; and the invention consists in the peculiar construction and arrangement of the parts constituting the seat-support, all as more fully hereinafter described.

Figure 1:
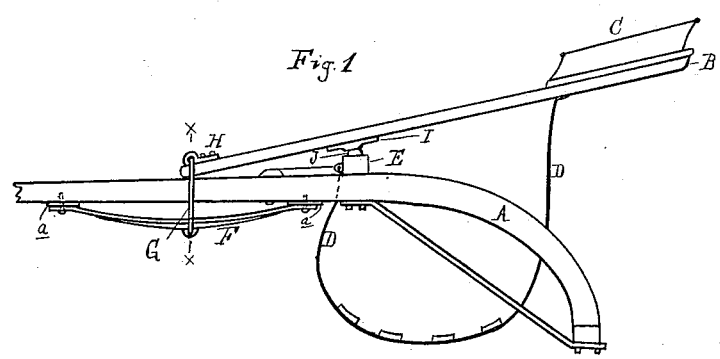
Figure 2:
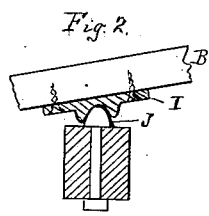
Figure 3:
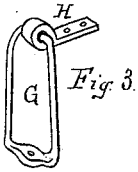
Figure 4:
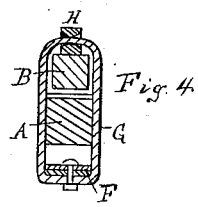
Figure 5:
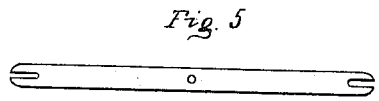

In the drawings which accompany this specification, Figure 1 is a side elevation of a cart embodying my improvements. Fig. 2 is a cross-section through the fulcrum of the side bars. Fig. 3 is a perspective view of the link connecting the spring and the seat-bars, and Fig. 4 is a section on the line *x x* in Fig. 1. Fig. 5 is a plan of the spring.

A are the shafts, B the seat-bars, C the seat, D the foot-rest, and E the cross-bar, of a road-cart of well-known construction, except as hereinafter more fully described.

F is a semi-elliptical spring secured on the under side of the shafts at its ends by means of bolts passing through longitudinal slots provided in the ends of the spring. I preferably interpose between the ends of the spring and the shafts the bearing-plate *a*, which is suitably secured to the shafts. The spring is so placed that its middle point is directly under the end of the seat-bars, and to connect the spring and its respective seat-bar I preferably use the link G. (Shown in Fig. 3.) The lower end of this link is provided with a horizontal bearing for the spring, which is secured thereon by means of a bolt, or in any other suitable manner. The link closely embraces the sides of the shaft to prevent any lateral play, but is free to move vertically, and its upper end passes over the end of the seat-bar and is secured thereto in any suitable manner, preferably by means of the strap and eye H.

The seat-bars are fulcrumed upon the cross-bars in the following manner: To the under side of the seat-bar I attach directly over the cross-bar the cup-shaped bearing I, and upon the cross-bar I secure a conical stud, J, adapted to fit into the cup-bearing of the seat-bar. This conical stud I preferably make integral with the head of a bolt, which is secured into the cross-bar, as shown in Fig. 2.

In operation, the driver being on his seat, his weight will slightly raise the ends of the seat-bars and compress the spring until the seat-bar is balanced upon the conical bearing. The spring is thus under constant tension and the end of the seat-bars slightly above the shaft, allowing a free spring motion both up and down.

I am aware of the use of a leaf-spring with one end firmly attached to the shaft and with its free end connected to the end of the seat-bar. The object of my invention is to improve this construction, as it will be plainly seen that such a spring must have a great amount of vibratory motion, and thereby impart to the seat a short jerky unpleasant motion even on a level road, while with my construction, with a spring of the same elasticity, there is less than one-third of the vibratory motion at the point at which the seat-bar is connected.

Another advantage of my spring is that it slides on the shaft within the limits of its expansion, and this greatly reduces the wear and tear on the parts and the sudden jerks in the direction of the draft. The easy motion of the spring is further aided by the slight friction of the ends of the spring against the bearing-plates.

Aside from these advantages there are constructive advantages, which will be readily perceived by the practical carriage-builder.

The advantages of my cup-bearing fulcrum of the seat-bars are, first, that it is impossible to break it in ordinary use, while with the use of a bolt-connection, as ordinarily employed, the bolt is continually being broken or lost; second, in shipping the carts in car-load lots, the carts being first set up to see that they are perfect, they are put in "knockdown" shape for loading. The seat-bars are detached from the shafts, and it will be seen that in setting the carts up and in taking them apart there is a saving of labor and consequent expense, and no loose parts to become lost. In the present state of the competition in this line of goods this is quite an item in the cost, besides the saving of annoyance to the purchaser. In practice this cup-bearing has proven entirely satisfactory.

I preferably use the link G to connect the spring and seat-bars, the sides of the link embracing the sides of the shaft closely, that there may be no jarring to the seat from the striking of the shaft against the link, as is the case where the side play is allowed in the link. The seat is then restricted to a vertical play, and side motion is prevented. Where the ends of the seat-bars have lateral play an unpleasant jarring motion is given to the seat.

What I claim as my invention is—

1. The combination, with the shafts and cross-bar of a road-cart, of seat-bars fulcrumed upon the cross-bars, semi-elliptical seat-supporting springs attached to the under side of the shafts and having a longitudinal play thereon, and links embracing the shafts and spring and seat-bars, connecting the forward end of the seat-bars with the springs at or near the center thereof.

2. The combination, with the shafts and cross-bar of a road-cart, of seat-bars having their forward ends connected to springs secured to the shafts, and cup-bearings I J, formed between the seat-bars and cross-bar, substantially as described.

In testimony whereof I affix my signature, in presence of two witnesses, this 26th day of October, 1887.

WILLIAM A. PATERSON.

Witnesses:
H. S. SPRAGUE,
WM. T. SPRAGUE.